United States Patent
Winger et al.

(10) Patent No.: US 7,170,561 B2
(45) Date of Patent: Jan. 30, 2007

(54) METHOD AND APPARATUS FOR VIDEO AND IMAGE DEINTERLACING AND FORMAT CONVERSION

(75) Inventors: Lowell L. Winger, Waterloo (CA); Yunwei Jia, Milton (CA)

(73) Assignee: LSI Logic Corporation, Milpitas, CA (US)

( * ) Notice: Subject to any disclaimer, the term of this patent is extended or adjusted under 35 U.S.C. 154(b) by 511 days.

(21) Appl. No.: 10/727,476

(22) Filed: Dec. 4, 2003

(65) Prior Publication Data

US 2005/0122426 A1    Jun. 9, 2005

(51) Int. Cl.
*H04N 7/01* (2006.01)

(52) U.S. Cl. ............... 348/448; 348/441; 348/452

(58) Field of Classification Search ........... 348/441, 348/443, 448, 451, 452, 458, 459; *H04N 7/01, H04N 11/20*
See application file for complete search history.

(56) References Cited

U.S. PATENT DOCUMENTS

| | | | |
|---|---|---|---|
| 5,019,903 A * | 5/1991 | Dougall et al. | 348/448 |
| 5,689,305 A * | 11/1997 | Ng et al. | 348/441 |
| 6,181,382 B1 * | 1/2001 | Kieu et al. | 348/459 |

* cited by examiner

*Primary Examiner*—Sherrie Hsia
(74) *Attorney, Agent, or Firm*—Christopher P. Maiorana, P.C.

(57) ABSTRACT

A method and apparatus for deinterlacing a picture is disclosed. The method generally includes the steps of (A) calculating a plurality of differences among a plurality of current samples from a current field of the picture, the differences being calculated along a plurality of line segments at a plurality of angles proximate a particular position between two field lines from the current filed, (B) generating a first sample at the particular position by vertical filtering the current field in response to the differences indicating that the particular position is a non-edge position in the picture and (C) generating a second sample at the particular position by directional filtering the current field in response to the differences indicating that the particular position is an edge position in the picture.

20 Claims, 8 Drawing Sheets

METHOD AND APPARATUS FOR VIDEO AND IMAGE DEINTERLACING AND FORMAT CONVERSION

FIELD OF THE INVENTION

The present invention relates to a digital video generally and, more particularly, to a method and apparatus for video and image deinterlacing and format conversion.

BACKGROUND OF THE INVENTION

Images and video come in a large variety of formats. For many applications, a conversion between formats is performed. A high-quality, low-cost method for converting the video signals is very useful for such applications as (i) converting interlaced NTSC video at 30 fields/second to progressive video with a similar or larger horizontal and vertical resolution at 60 frames/second for display on progressive televisions, (ii) performing a high-quality "zoom" function on either interlaced or progressive video and (iii) increasing the horizontal and/or vertical resolution of progressive or interlaced video and images.

Existing solutions for video deinterlacing include (i) bob (i.e., vertical spatial filter), (ii) weave (i.e., temporal filter), (iii) VT-filtering (i.e., vertical spatial filter combined with temporal filter), (iv) motion-adaptive and motion-compensated techniques and (v) edge-based spatial filtering. The existing video techniques which are not temporal in nature can also be applied to image upconversions (i.e., vertical and edge-based spatial filtering). Horizontal and edge-based spatial filtering are used for horizontal upsampling of images and video.

Vertical filtering is known to produce temporal flickering artifacts in video and significantly reduced vertical detail in both images and video. Odd and even parity lines are alternately blurred in the video and interpolated in a vertical direction only from adjacent lines. The lack of vertical detail is particularly noticeable for sharp edges.

Temporal filtering is known to produce "jaggies". Jaggies a re interlace artifacts that are extremely objectionable for moving objects.

The VT-filtering is a fixed (i.e., non-adaptive) filtering that combines a high pass version of a previous opposite parity field with a lowpass interpolation of a missing line from a current field. The VT-filtering is a low-cost line-based process that is cost effective to implement in silicon, but is known to produce temporal artifacts. The artifacts can include trailing edges or "edge ghosts" from previous fields that appear behind moving objects.

Motion adaptive techniques make pixel-level, block-level, and/or picture-level decisions about whether to use weave or bob or a blended combination of weave and bob for particular pixels, blocks and/or pictures. Weave is the best option for still portions of video, while a poor choice for moving areas. Hard block-level decisions can lead to objectionable blocking artifacts. However, more advanced motion adaptive deinterlacing techniques that combine weave and bob suffer mainly from relatively poor performance for moving video, for which all of the drawbacks of bob are encountered. For stationary regions, however, the flickering artifact suffered by bob can be greatly reduced.

Motion compensated techniques operate in a similar manner to motion adaptive techniques. A consideration for motion compensated techniques is that motion compensated pixels are chosen from a previous opposite parity field rather than always using the co-located pixels from the previous opposite parity field to replace the missing pixels in a progressive frame that is formed from the current field (i.e., weave). An advantage of the motion compensated technique is that moving video that can be well estimated and motion-compensation will yield far superior deinterlaced video. A disadvantage of motion compensated technique is that motion estimation is typically far more expensive than any of the previously mentioned techniques. Furthermore, if motion estimation fails on the video sequence (i.e., highly irregular motion, non-smooth motion fields or various lighting effects may cause motion estimation to fail), then motion compensated techniques can be no better than less complex methods. Furthermore, even when motion estimation is successful, the amount of high-frequency information that can be transferred from the previous opposite parity field to the estimate of the missing lines for reconstruction a progressive frame from the current field depends upon the sub-pel motion between the two fields. In the worst case, objects can move by an integer number of pels plus exactly one-half pel in the vertical direction in the temporal interval that passes between the previous and current field. Therefore, no additional high-frequency vertical information for the missing lines of the current field can be gleaned from the previous field through the motion compensated estimate from the previous field. In practice, however, motion compensated deinterlacing greatly increases vertical detail, while greatly reducing flickering artifacts on a broad range of video, such that the main drawback is complexity.

Edge-based spatial filtering operates on only the current field and is capable of producing a far superior estimate of the pixels from the missing lines than what is possible with vertical filtering only. To a lesser extent than vertical filtering, edge-based spatial filtering also suffers from lack of vertical detail. In particular, high frequency textures that lack edges will not be improved over simple vertical filtering.

SUMMARY OF THE INVENTION

The present invention concerns a method for deinterlacing a picture. The method generally comprises the steps of (A) calculating a plurality of differences among a plurality of current samples from a current field of the picture, the differences being calculated along a plurality of line segments at a plurality of angles proximate a particular position between two field lines from the current field, (B) generating a first sample at the particular position by vertical filtering the current field in response to the differences indicating that the particular position is a non-edge position in the picture and (C) generating a second sample at the particular position by directional filtering the current field in response to the differences indicating that the particular position is an edge position in the picture.

The objects, features and advantages of the present invention include providing a method and apparatus for video and image deinterlacing and format conversion that may (i) utilize only a modest amount of silicon, (ii) uses minimal memory bandwidth to operate, (iii) operate on a small integer number of line buffers from each field, (iv) perform minimal arithmetic operations, (v) produce improved quality compared with conventional approaches, (vi) achieve a good trade-off between reducing flicker, reducing interlace artifacts, retaining high vertical frequencies and rendering edges smoothly, (vi) generate better looking edges than with plain motion adaptive or motion compensated deinterlacing, (vii) generate better looking non-edge regions than with purely edge-based interpolation or other purely spatial-based interpolation techniques and/or (viii) effectively reduce blocking artifacts while permitting individual filtering methods to contribute best performances to improving quality in local regions thru a combination of picture and pixel-level adaptive and/or non-adaptive switching and/or blending between the alternative methods.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention is best realized as a very low-cost, but high quality deinterlacing process, method, apparatus and/or architecture. The invention may be referred to as a reduced enhanced motion adaptive deinterlacing (REMADI) architecture. High quality may be realized through the several attributes of the method. The REMADI approach may adaptively select and blend picture-level and pixel-level switching and blending mechanism estimates for pixels or luminance samples located between the horizontal field lines of a current field. The estimates may be based upon (i) previous field pixels (e.g., weave), (ii) a vertical filtered interpolation from the current field (e.g., bob) and/or (iii) a directionally interpolated estimate from the current field. The directional interpolated estimate generally provides an efficient approach that may minimize silicon cost by reducing a bit-depth of a detector and using regular structures such that arithmetic operations may be reduced.

Figure 1:
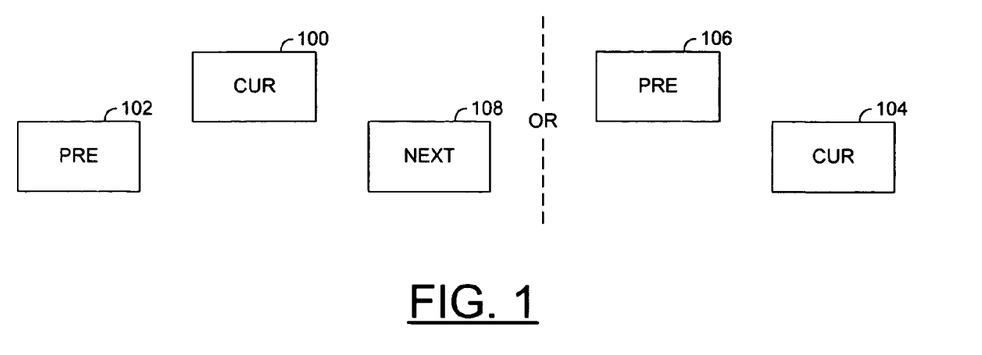
FIG. 1 is a block diagram of available fields.

Referring to FIG. 1, a block diagram of available fields is shown. Low cost is generally realized through several features of the REMADI approach. The present invention may operate on only two fields at a time, thus reducing a bandwidth cost for reading the fields from a memory circuit. For example, the present invention may operate on a current field 100 (e.g., CUR) having a particular parity (e.g., even parity) and a neighboring or previous field 102 (e.g., PRE) of an opposite parity (e.g., odd parity). In another example, the present invention may operate on a current field 104 having an odd parity and a neighboring field 106 having an even parity. The present invention may also operate on an optional third field 108 (e.g., NEXT) having either parity. Since memory bandwidth is generally a significant factor in determining system cost and is a resource whose scarcity often limits concurrent operations in complex systems, the reduction in bandwidth may be a significant advantage of the current invention over complex motion compensated or adaptive techniques that use more fields.

In addition, the current invention generally performs line-based processing for a small integer number of field lines (e.g., two or four) at a time from the current field 100 and only a small integer number of field lines (e.g., one) from the neighboring field 102. The resulting structure may also simplify any implementation of the method in silicon.

Pixels or luminance samples used for estimating a best direction for directional interpolation may be stored at a reduced bit-depth to reduce both storage and arithmetic complexity. The reduced bit-depth generally permits high-contrast edges to be effectively estimated, while consciously determining not to estimate very low-contrast edges for which lack of vertical detail is much less visible.

The angular detection estimation method may be implemented with a series of moving averages which may be efficiently implemented with running average technique, greatly reducing a number of arithmetic operations used for computation. Furthermore, the directional filtering and estimation may combine pixel-level and picture-level switching and blending mechanisms with spatial filtering to provide improved low-cost upsampling of still images. The directional filtering and estimation pixel-level and picture-level switching and blending mechanisms may also be combined with spatial filtering and optional motion-estimation from previous frames and/or fields to provide improved low-cost upsampling of progressive and/or interlaced video to increase horizontal and/or vertical resolution (e.g., super resolution video).

Compared with an existing enhanced motion adaptive deinterlacing (EMADI) method operating on three fields, the present invention may use only two fields and therefore saves memory bandwidth. However, a static check with three fields may be a useful design option to properly deal with still images and/or still overlays.

For simplicity of description, the current field 100 may be considered as a top field and the neighboring (previous) field 102 may be considered as a bottom field of a frame. In general, the current field 100 comprises field lines 0, 2, 4, ..., 2Z−2, and the previous field 102 comprises field lines 1, 3, 5, ..., 2Z−1, where Z is the number of available lines in each field. The deinterlacing generally constructs the "missing" lines in the current field 100 (e.g., lines 1, 3, 5,..., 2Z−1) which, together with the available lines in current field 100, may form a complete frame of 2Z lines.

Figure 2:
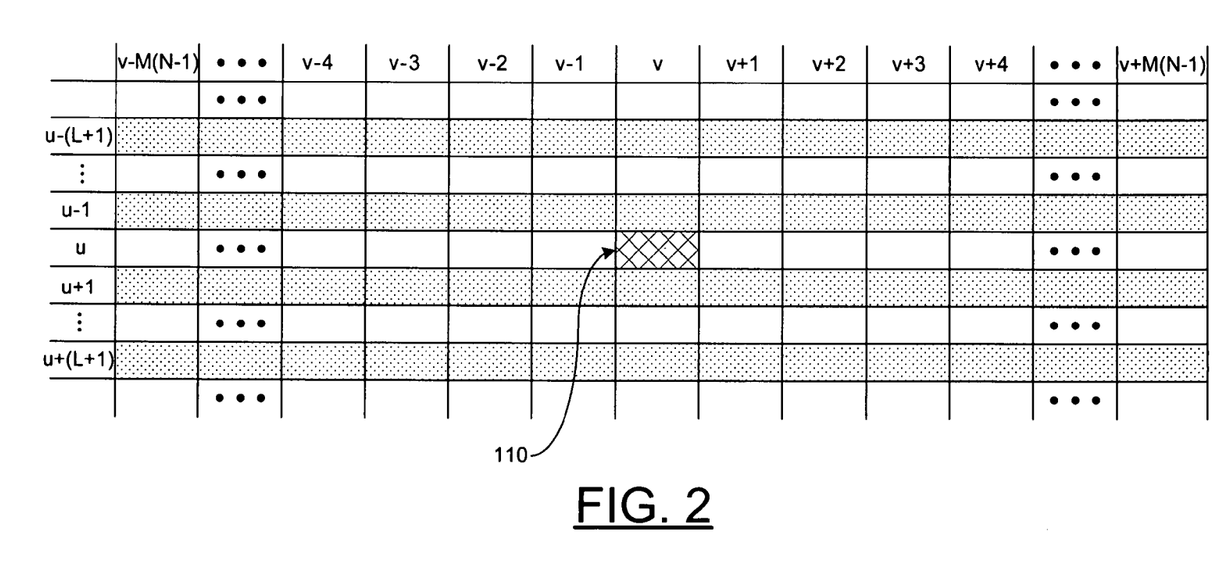
FIG. 2 is a partial block diagram of an example current field.

Referring to FIG. 2, a partial block diagram of an example current field 100 is shown. A subset of the available field lines u−(L+1) to u+(L+1) and several columns v−M(N−1) to v+M(N−1) are generally illustrated, where (u,v) is a particular position, L is a number of lines (e.g., 0≦L≦6 lines), N is a number of angles being considered (e.g., 2≦N≦32 angles) and M is a spacing between the angles (e.g., 0≦M≦8 pixels). To construct an interpolated sample 110 at the particular position (u,v) in the current field 100, the local samples at positions (i,j) (where, i=u−(L+1), ..., u−1, u+1, ..., u+(L+1) and j=v−M(N−1), v−1, v, v+1, ..., v+M(N−1)) and a co-located sample at the particular position (u,v) in the previous field 102 may be used.

Figure 3:
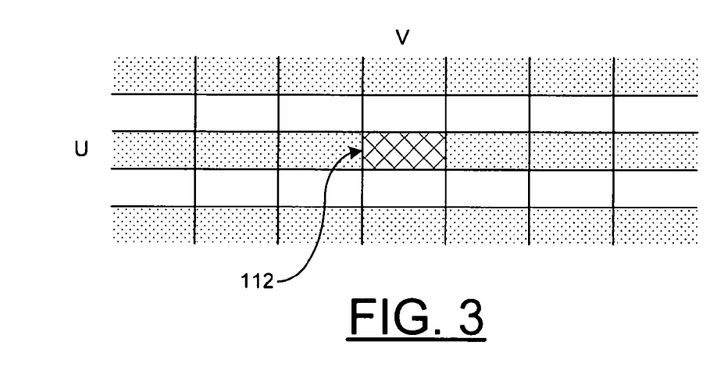
FIG. 3 is a partial block diagram of an example previous field.

Referring to FIG. 3, a partial block diagram of an example previous field 102 is shown. The previous field 102 may include a pixel or luminance sample 112 at the particular position (u,v) for which the interpolated sample 110 is being added to the current field 100. The previous field 102 may occur before or after the current field 100 in time relative to a display sequence.

Figure 4:
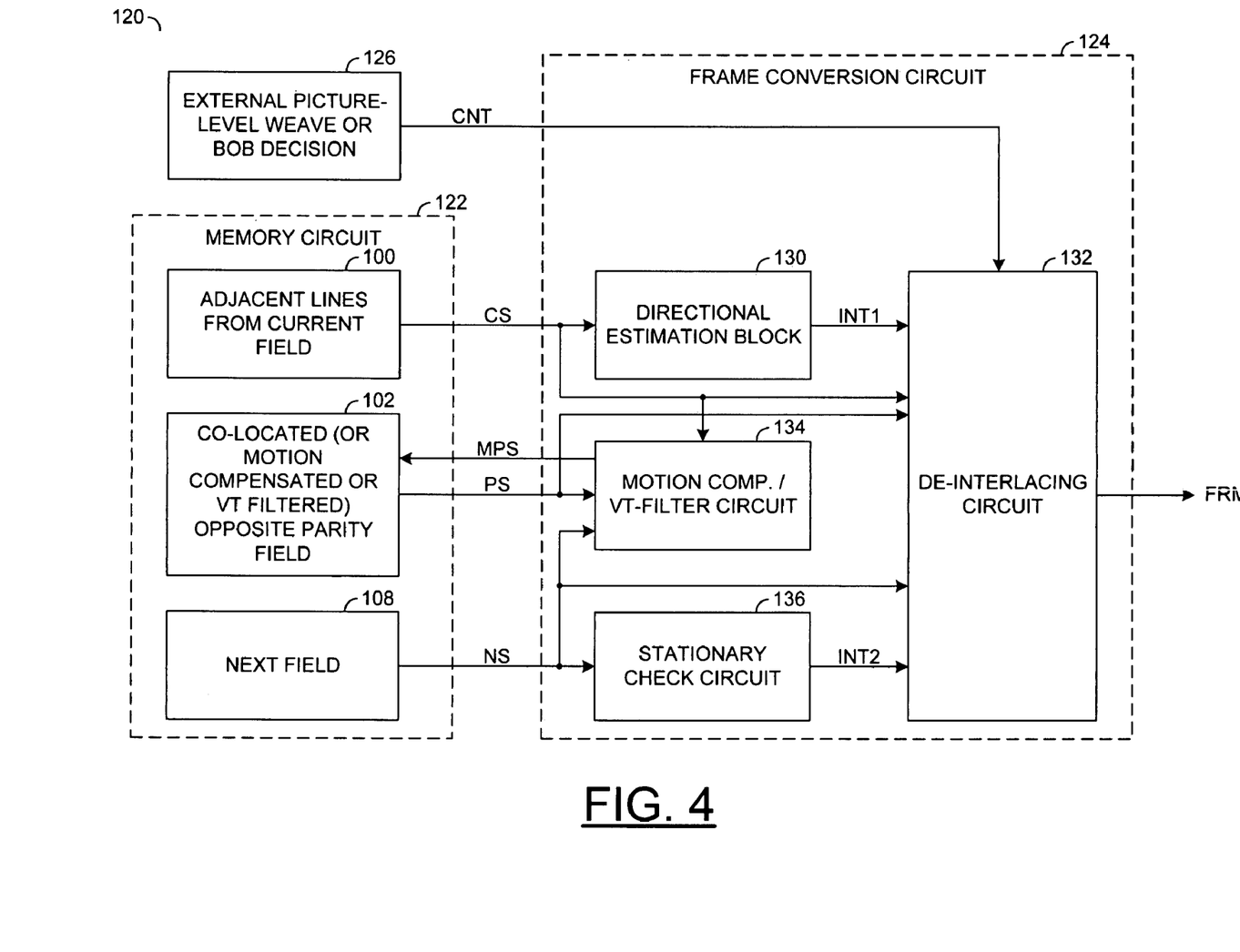
FIG. 4 is a block diagram of an example design for an apparatus implementing a preferred embodiment of the present invention.

Referring to FIG. 4, a block diagram of an example design for an apparatus 120 implementing a preferred embodiment of the present invention is shown. The apparatus or system 120 generally comprises a memory circuit (or module) 122, a circuit (or module) 124 and a circuit (or module) 126. The circuit 124 may be implemented as a format conversion circuit. The circuit 126 may be implemented as a decision circuit.

The memory circuit 122 may provide data from two or more fields to the format conversion circuit 124. A signal (e.g., CS) may convey current samples or pixels from the current field 100 stored in the memory circuit 122 to the format conversion circuit 124. A signal (e.g., PS) may convey previous samples or pixels from the previous field 102 stored in the memory circuit 122 to the format conversion circuit 124. An optional signal (e.g., NS) may convey next samples or pixels from the next field 108 stored in the memory circuit 122 to the format conversion circuit 124. A signal (e.g., MPS) may convey modified previous samples from the format conversion circuit 124 back to the memory circuit 122 for storage. The modified previous samples may be motion compensated or VT-filtered versions of the previous samples.

The decision circuit 126 may generate a signal (e.g., CNT) to the format conversion circuit 124. The signal CNT may be implemented as one or more control signals. In one embodiment, the signal CNT may transfer information to force a vertical spatial filtering and to force a temporal filtering.

The format conversion circuit 124 generally comprises a circuit (or module) 130, a circuit (or module) 132, a circuit (or module) 134 and a circuit (or module). The circuit 130 may be implemented as a directional estimation circuit or block. The circuit 132 may be referred to as a deinterlacing circuit or block. The circuit 134 may be implemented as a motion compensation (MC) and/or VT-filter circuit or block. The circuit 136 may be implemented as a stationary check circuit or block. The circuit 134 may be implemented as a motion compensation (MC) and/or VT-filter circuit or block. The circuit 136 may be implemented as a stationary check circuit or block.

The directional estimation circuit 130 may generate a signal (e.g., INT1) provided to the deinterlacing circuit 132. The stationary check circuit 136 may generate a signal (e.g., INT2) provided to the deinterlacing circuit 132. The deinterlacing circuit 132 may also receive the signal CNT from the decision circuit 126. The MC/VT-filter circuit 134 may generate the signal MPS. The deinterlacing circuit 132 may generate a signal (e.g., FRM). The signal FRM may convey a deinterlaced frame generated from the current field 100, the previous field 102 and optionally the next field 108.

The directional estimation circuit 130 may be operational to determine if the position (u,v) for the interpolated pixel 110 is part of an angled feature in a picture created by the current field 100 and the previous field 102. The directional estimation circuit 130 may also be operational to determine a most probable orientation of the angled feature relative to a vertical axis and/or horizontal axis passing through the position (u,v). A yes/no determination for being a part of the angled feature and an estimated direction of the angled feature may be presented in the signal INT1.

The deinterlacing circuit 132 may be operational to generate a frame in the signal FRM base on the current samples in the signal CS, the previous samples in the signal SP and the optional next samples in the signal NS. The deinterlacing procedure or method may be adaptive to include one or more types of filtering and/or blending based on the information received in the control signals CNT, INT1 and INT2. The deinterlacing procedure may also be adaptive to picture-level and/or pixel-level estimations.

The MC/VT-filter circuit 134 may be operational to pre-process the previous field 102 prior to deinterlacing. The MC/VT-filter circuit 134 may perform motion compensation on the previous field 102 and/or vertical spatial filter combined with temporal filter. The motion compensation may include averaging the previous field 102 (immediately before the current field 100 in time) with the next field 108 (immediately after the current field 100 in time) to estimate what the previous field 102 would be at the same time of the current field 100. Pre-processing may include blending the previous field 102 with a filtered version of the current field 100. Other forms of motion compensation, vertical filtering and/or temporal filtering may be implemented to meet the criteria of a particular application.

The stationary check circuit 136 may be operational to perform horizontal stationary edge and/or stationary pixel checks based upon a picture within the next field 108. The checks may decrease line flickering for stationary areas of the video. Results of the checks may be provided in the signal INT2 to the deinterlacing circuit 132. The next field 108 may also be used to increase an accuracy of interpolated pixel values for construction of the current frame from the current field if the next field 108 is of the opposite parity as the current field 100.

Figure 5:
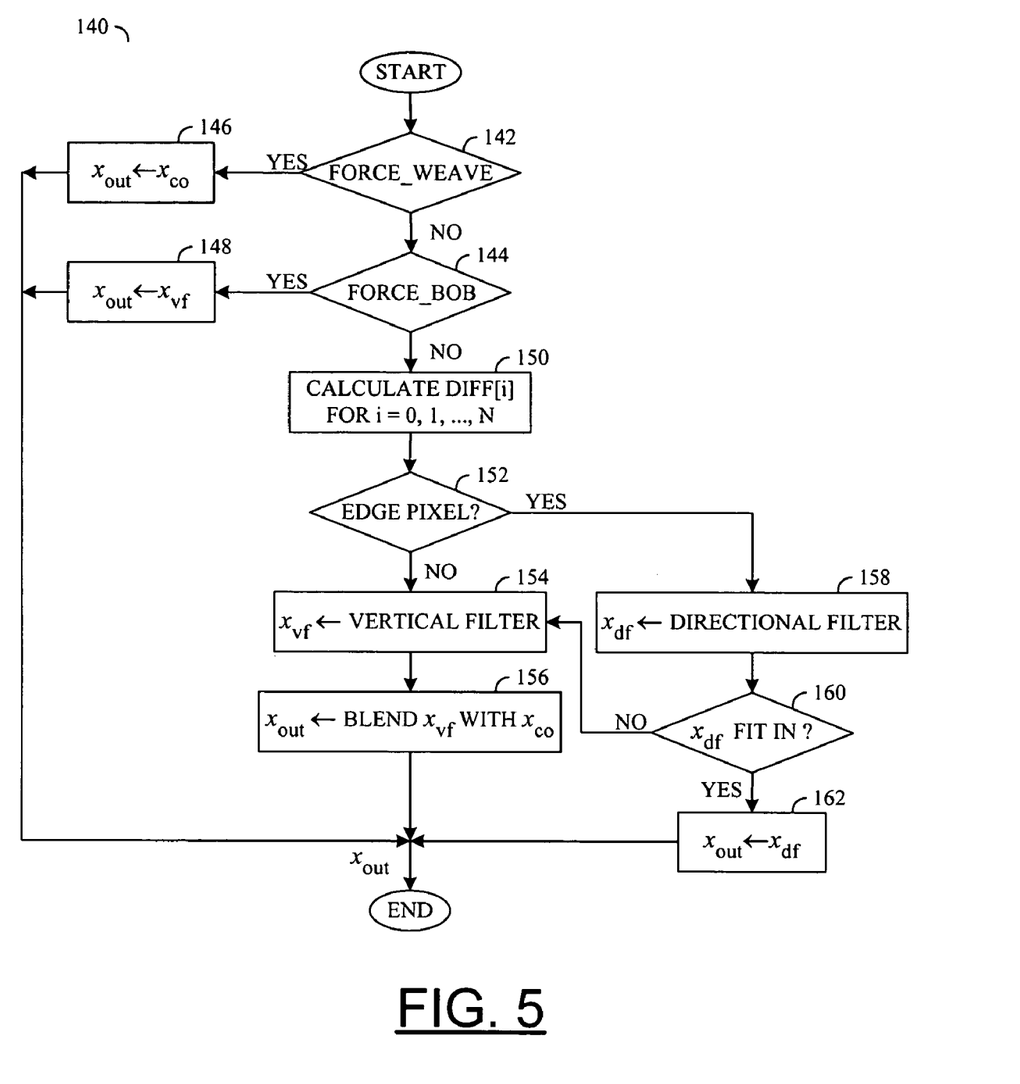
FIG. 5 is a flow diagram for a deinterlacing method.

Referring to FIG. 5, a flow diagram for the deinterlacing method 140 is shown. The deinterlacing method 140 includes an examination of the signal CNT to determine if a forced weave flag (e.g., decision block 142) or a forced bob flag (e.g., decision block 144) has been asserted. If the forced weave flag is true (e.g., the YES branch of the decision block 142) a value (e.g., Xout) for the interpolated sample 110 may be set to the co-located value (e.g., Xco) for the co-located previous sample 112 from the previous field 102 (e.g., block 146). If the forced weave flag is false and the forced bob flag is true (e.g., the YES branch of decision block 144), a vertical spatial filtering may be performed proximate the position (u,v) to generate a vertically filtered value (e.g., Xvf) for the interpolated sample 110 (e.g., block 148). Both the forced weave and the forced bob flag should not be true simultaneously. The forced weave condition may be used to support external picture stillness detect such as that in inverse telecine. The forced bob condition may be used to support external scene change detection.

If no forced weave or bob has been commanded by the decision circuit 126 (e.g., the NO branch of the decision block 144), the directional estimation circuit 130 may calculate a difference array (e.g., DIFF[i]) centered around the position (u,v) of the interpolated sample 110 for i different angles (e.g., block 150). The directional estimation circuit 130 may then examine the difference array DIFF[i] to determine if the interpolated sample 110 is part of an edge of an angled feature in the picture (e.g., decision block 152).

If the interpolated sample 110 is not an edge pixel (e.g., the NO branch of the decision block 152), the deinterlacing circuit 132 may perform a vertical spatial filter along the vertical axis running through the position (u,v) to generate the vertical filter value Xvf for the position (u,v) in the current field 100 (e.g., block 154). The vertical filter value Xvf may be blended with the co-located value Xco from the previous field 108 to generate the interpolated sample value Xout (e.g., block 156).

If the interpolated sample 100 is an edge pixel (e.g., the YES branch of the decision block 152), the deinterlacing circuit 132 may generate a directional filtered value (e.g., Xdf) by directional filtering the current samples from the current field 102 based on the direction provided from the directional estimation block 130 (e.g., block 158). A check may then be made of the directional filter value Xdf for similarity/dissimilarity with vertical activity in the picture around the position (u,v) (e.g., decision block 160).

If the directional filter value Xdf fits with the local vertical activity (e.g., the YES branch of the decision block 160), the interpolated sample value Xout is set to the directional filter value Xdf (e.g., block 162) and the process 140 may be repeated for another position between two field lines of the current field 100. If the direction filter value Xdf is dissimilar to the local vertical activity (e.g., the NO branch of the decision block 160), the deinterlacing circuit 132 may perform the vertical spatial filtering (e.g., block 154) and blending (e.g., block 156) to generate the interpolated sample value Xout.

Figure 6:
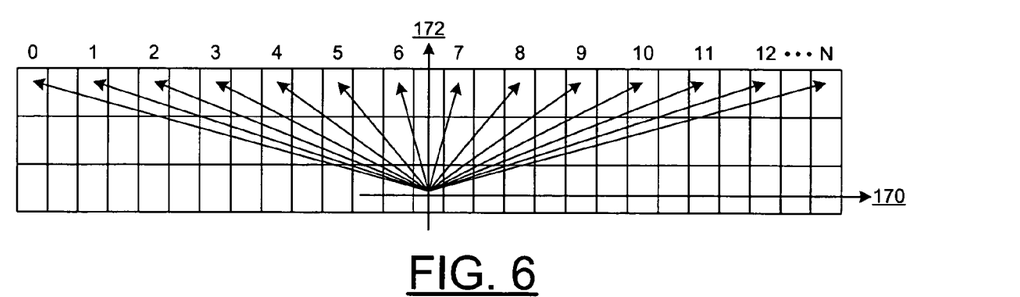
FIG. 6 is a diagram illustrating example detectable angles.

Referring to FIG. 6, a diagram illustrating example detectable angles is shown. The directional estimation circuit 130 may examine a picture to detect a edge in an angled feature near to the position (u,v). In the REMADI architecture, the picture may be searched along multiple (e.g., 2–32) angles (numbered 0–N in FIG. 6). As measured from a horizontal axis 170, an angle i is generally defined by equations 1 and 2 as follows:

$$\text{Angle } i = 180° - \tan^{-1}\left(\frac{2}{(N-1)-2i}\right), \quad \text{Eq. (1)}$$

for $0 \le i \le ((N/2)-1)$ $$\text{Angle } i = \tan^{-1}\left(\frac{2}{2i-(N-1)}\right), \quad \text{Eq. (2)}$$

for $(N/2) \le i \le (N-1)$

In one embodiment, the angles may be measured relative to a vertical axis 172. Other angles and/or numbers of angles may be implemented to meet the criteria of a particular application. To interpolate the sample 110 at the position (u,v) in the current field 100, the array DIFF[i] may be calculated for each angle i per equation 3 as follows:

$$DIFF[i] = \sum_{x=0}^{N-1}\sum_{y=0}^{L} |CUR(a,b) - CUR(c,d)| \quad \text{Eq. (3)}$$

where a=u+2y−(L+1), b=v+((N−1)−2i)y+x+(L+1)i−M(N−1), c=u+2y−1, d=v+((N−1)−2i)y+x+i−(N−1) and CUR(a,b)−CUR(c,d) is a difference between a first sample in the current field 100 at a position (a,b) and a second sample in the current field 100 at a position (c,d). The directional estimation circuit 130 may present the N arrays DIFF[i] (one array DIFF[i] for each of the N angles) to the deinterlacing circuit 132 in the signal INT1. The calculation of the arrays DIFFs generally impacts the cost of the computation.

Figure 7:
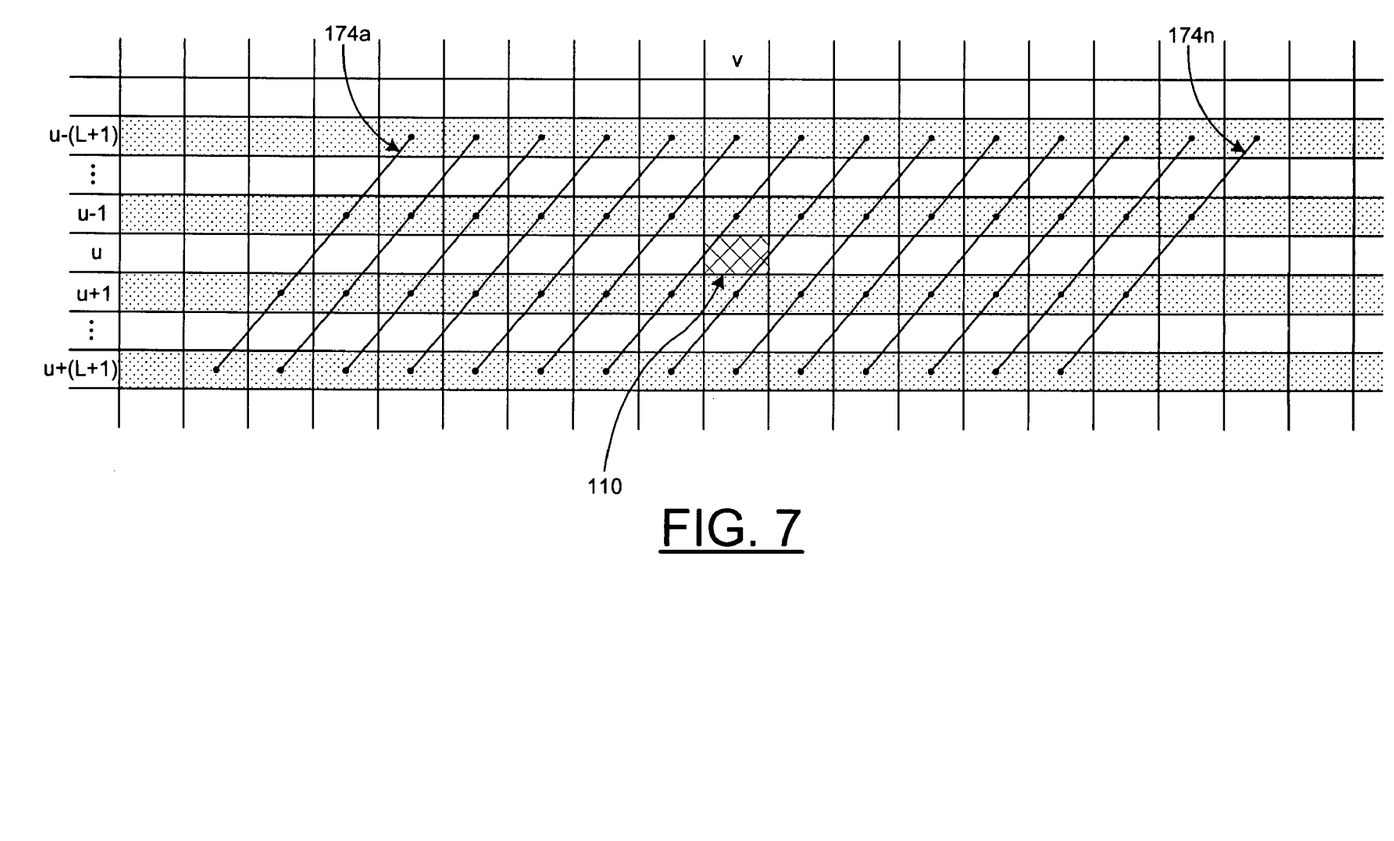
FIG. 7 is a diagram illustrating multiple line segments at a first angle.
Figure 8:
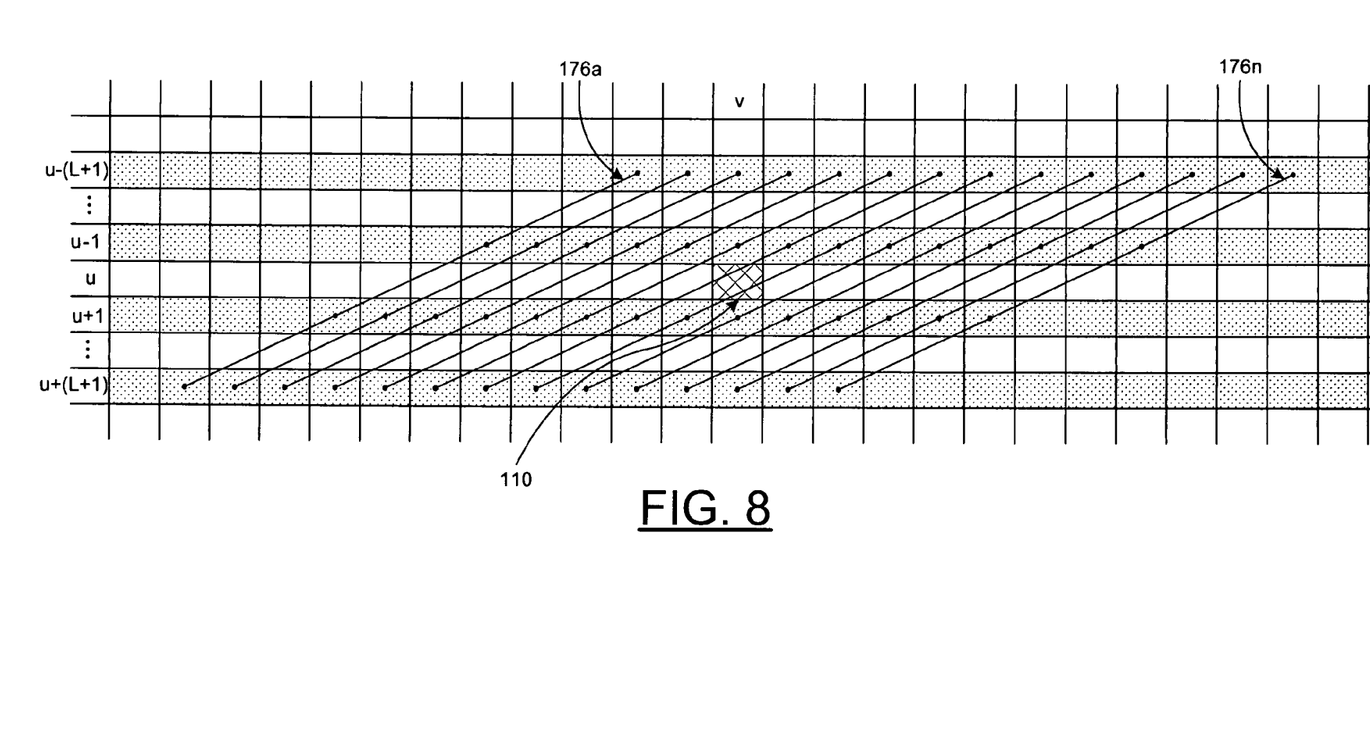
FIG. 8 is a diagram illustrating multiple line segments at a second angle.
Figure 9:
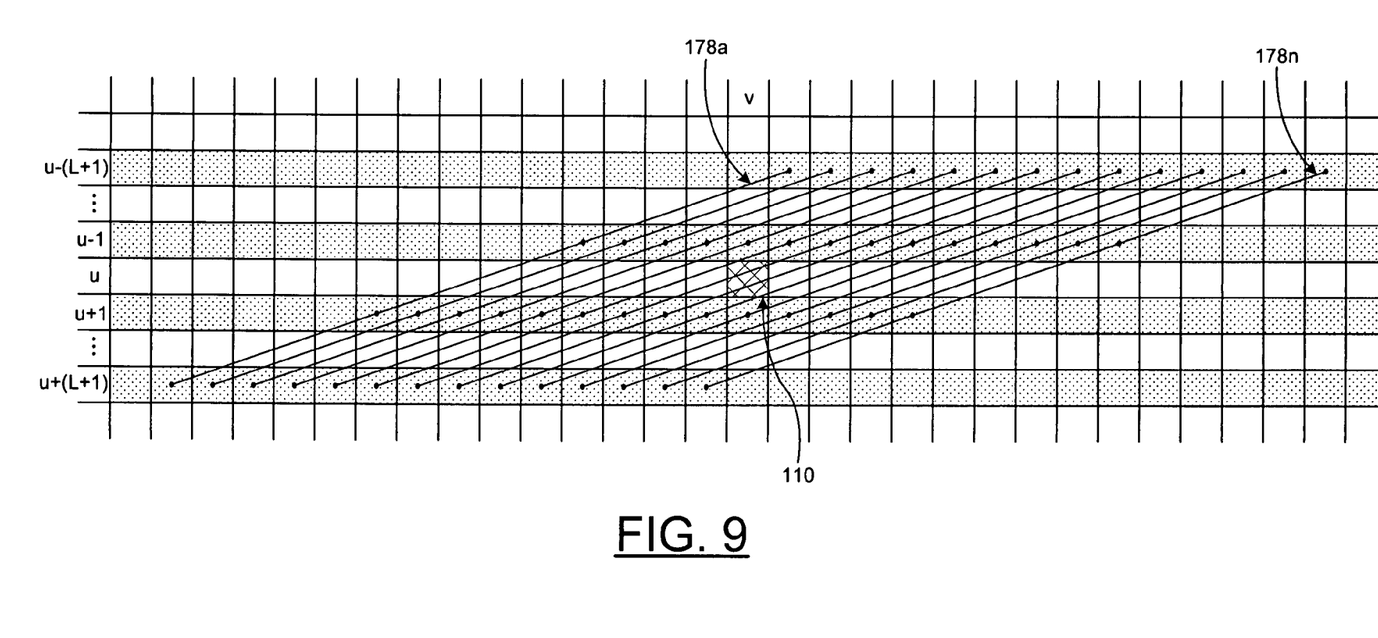
FIG. 9 is a diagram illustrating multiple line segments at a third angle.

Referring to FIGS. 7–9, diagrams for three example angles are shown. FIG. 7 generally illustrates multiple (e.g., N=14) line segments 174a–174n used to calculate DIFF[i] at a first angle of 63.4° (e.g., N=14, M=1, i=(N/2)=7). FIG. 8 generally illustrates the N line segments 176a–176n at a second angle of 33.7° (e.g., N=14, M=1, i=((N/2)+1)=8). FIG. 9 generally illustrates the N line segments 178a–178n at a third angle of 21.8° (e.g., N=14, M=1, i=((N/2)+2)=9). In each example, a unique array DIFF[i] may be calculated as a summation of the (L+1)N (e.g., 3×14=42) pair-wise absolute differences along the N line segments, each of which connects multiple black dots in the figures. Other numbers of the line segments, lengths of the line segments and spacing of the line segments may be implemented to meet the criteria of a particular application.

The value for each entry in the array DIFF[i] generally indicates a change in the intensity (e.g., luminance) of the picture along for each of the associated line segments (e.g., 174a–174n) at a single angle i. Low numerical values in each of the entries in the array DIFF[i] may indicate that the line segment did not cross an edge (e.g., bright to dark) in the picture. The directional estimation circuit 130 may operate on a reduced precision version of the current field 100. Limiting each of the current samples to G bits (e.g., $2 \le G \le 8$ bits per sample) is generally sufficient to capture edges with an average step height of at least $2^G$ gray levels in the current field 100 and thus may significantly reduce the hardware cost without significantly affecting perceptual performance.

Figure 11:
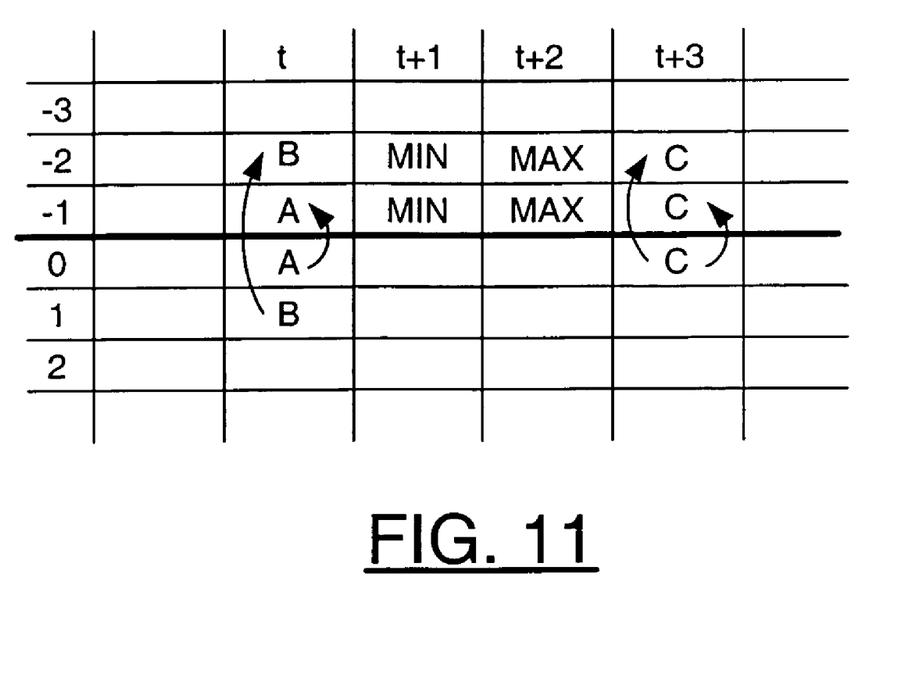
FIG. 11 is a diagram of a field at an outside boundary.

At the outside boundaries of the current field 100, a mirror principle may be applied to generate new pixels or new samples outside of the current field 100 as illustrated in FIG. 11. For example, the padding (or pad) sample at position (t, −1) is generally replaced by a sample at position (t, 0), the pad sample at position (t, −2) is generally replaced by the sample at position (t, 1), and so on. Other approaches for generating new samples outside the current field 100 may be implemented to meet the criteria of a particular application. For example, constant luminance values of a maximum value (e.g., 128) or a minimum value (e.g., 0) may be used for the pad samples outside the boundaries (e.g., see columns t+1 and t+2) . In another example, the samples at the inside edge of the field boundary may be copied and used as the new pad samples outside the boundary (e.g., see column t+3)

A pseudo code for calculating DIFF[i] is provided below. A short explanation of the variables used in the pseudo code follows. The variable DD is generally a two-dimensional array of N rows and N columns. Each element of DD may be a G-bit wide non-negative integer. A row DD[i] may be used as a circular buffer to record the N differences along the N parallel line segments of an angle i. For simplicity, the N parallel line segments of the angle i may be indexed as line segments 0, 1, . . . , N−1, from the leftmost to the rightmost. A difference along a line segment j may be recorded in DD[i][(s+j)% N], where s ($0 \le s \le (N-1)$) may be circularly incremented by 1 (e.g., increase by 1 and then mod N) after processing a pixel or sample.

DIFF is generally a one-dimensional array of N elements, each of which may be a multi-bit (e.g., 10 bit) wide non-negative integer. The array DIFF[i] may be used to record the summation of the N differences along the N parallel line segments of angle i according to equation 4 as follows:

$$DIFF[i] = \sum_{j=0}^{N-1} DD[i][j], \quad \text{for } i = 0, 1, 2, \ldots, N-1 \quad \text{Eq. (4)}$$

The pseudo code of calculation of DIFF generally comprises:

```
(1)  s=0
(2)  DD[i][j]=0 for i=0,1,...,N-1 and j=0,1,...,N-1
(3)  DIFF[i]=0 for i=0,1,...,N-1
(4)  For each sample in a row, from left to right, do
(5)      For i=0 to N-1 do
(6)          DIFF[i]=DIFF[i]-DD[i][s]
(7)          DD[i][s]=the difference in the rightmost line of
                  angle i
(8)          DIFF[i]=DIFF[i]+DD[i][s]
(9)          s=(s+1)%N
```

The deinterlacing method generally proceeds in a row-by-row manner from top to bottom of the current field 100. Before processing a row of samples, the variables s and arrays DD and DIFF may all initialized to zero as illustrated in the lines (1) to (3) of the pseudo code. For each sample, all of the N angles may be looped through as illustrated in lines (5) to (9) in the pseudo code. In the line (6) of the pseudo code, the difference of the leftmost line segment of the previous sample is subtracted from DIFF[i]. In line (7), the difference of the rightmost line segment of the current sample is calculated, which may then be added to DIFF[i] in line (8). In line (9), the variable s may be circularly increased by one.

After calculating the N arrays DIFF, a decision may be made whether or not the current pixel to be interpolated is located on an edge within the picture according to the following rules. Let DIFF_MIN1=DIFF[$\alpha$] be the minimum of the N DIFFs, DIFF_MIN2=DIFF[$\beta$] be the second minimum, DIFF_MIN3 be the third minimum and DIFF_MAX be the maximum. Also, let LEFT be the immediate neighboring angle to the left of angle $\alpha$, and RIGHT be the neighboring angle that is to the right of angle $\beta$. For example, if $\alpha$=8, then LEFT=7 and RIGHT=9. For the leftmost angle ($\alpha$=0), let LEFT=RIGHT=1. For the rightmost angle ($\alpha$=N-1), let LEFT=RIGHT=N-2.

Also, let $A=CUR[u-1][v-(N-1)]$, $B=CUR[u-1][v]$, $C=CUR[u-1][v+(N-1)]$, $D=CUR[u+1][v-(N-1)]$, $E=CUR[u+1][v]$, $F=CUR[u+1][v+(N-1)]$.

A sample may be declared to be an edge sample if the following conditions are satisfied:

```
(1)   DIFF_MIN1*21 < J*DIFF_MAX      // where J is a constant,
      2≤J≤32
(2)   && DIFF_MIN1 < TH_DIFF         // TH_DIFF is a
      programmable parameter with a suggested value of 1134
(3)   && DIFF_MIN1 != DIFF_MIN2 || DIFF_MIN2 !=
      DIFF_MIN3
(4)   && (α != 0 || max(|A-E|,|B-F|) < K)    // where K is a
      constant, 1≤K≤256
(5)   && (α != (N-1) || max(|B-D|,|C-E|) < K)
(6a)  && ((α+β != (N-1) && |α - β| == 1)
(6b)  || (α+β == (N-1) && DIFF_MIN1 != DIFF_MIN2)
(6c)  || (DIFF_MIN1*P < DIFF_MIN2 && DIFF[LEFT] < Q*DIFF_
      MIN2 && DIFF[RIGHT] < Q*DIFF_MIN2)   // where P and Q
      are constants, 1≤P≤8 and 1≤Q≤8
```

The condition (1) may help avoid background flicker by seeing that the edge direction may be much better than at least one other direction. The condition (2) generally establishes a minimum edge strength. The condition (3) may avoid detecting a wrong angle when three angles are equally good (useful for a case of reduced bit depth or low contrast area). The conditions (4) and (5) may add additional criteria on the two most shallow angles because the two most shallow angles sometimes cause noticeable artifacts. The conditions (6a), (6b), and (6c) are "OR"ed. The condition (6a) states that the best two angles are neighbors but not the middle angles (e.g., ((N/2)-1) and (N/2)) The condition (6b) states if the two best angles are the middle angles, then the associated arrays DIFF should be different. If not, then neither should be used. The condition (6c) puts additional conditions on the DIFFs if the best two angles are not neighbors (e.g., conditions (6a) and (6b) are not satisfied).

If only the most significant 4 bits of each sample are used in calculating DIFF, the threshold TH_DIFF in condition (2) should become 71 and the constant K in conditions (4) and (5) should become 4. Calculating DIFF_MAX and DIFF_MIN3 may be unnecessary sometimes because the first condition is generally equivalent to DIFF_MIN1*21<J*DIFF[0]||DIFF_MIN1*21<J*DIFF[1]|| . . . ||DIFF_MIN1*21<J*DIFF[(N-1)] and the third condition is generally equivalent to DIFF_MIN1!=DIFF_MIN2||DIFF_MIN1!=DIFF[i] for all i except $\alpha$ and $\beta$.

If the interpolated sample 110 is declared to be an edge sample, a directional filter may be applied to generate the directional filter value Xdf per equation 5 as follows:

$$Xdf=(CUR(u-1,v-(N/2)+\alpha)+CUR(u+1,v+((N/2)-1)-\alpha)+CUR(u-1,v-((N/2)-1)+\alpha)+CUR(u+1,v+(N/2)-\alpha)+2)/4 \quad \text{Eq. (5)}$$

In general, the four current samples used in the directional filter from equation 5 may be "directionally" centered at the position (u,v).

If the interpolated sample 110 is declared not to be an edge pixel, a 4-tap vertical filter may be applied to generate the interpolated value Xvf per equation 6 as follows:

$$Xvf=(-CUR(u-3,v)+9*CUR(u-1,v)+9*CUR(u+1,v)-CUR(u+3,v)+8)/16 \quad \text{Eq. (6)}$$

If appropriate, the value Xvf may be clipped into the range [0, 255].

In general, the interpolated pixel 100 should not change the local vertical activity dramatically. Thus, the following "protection" condition may be imposed per equation 7 as follows:

$$2*(|CUR(u-1,v)-Xdf|+|CUR(u+1,v)-Xdf|)<R*|CURE(u-1,v)-CUR(u+1,v)|, \text{ where } R \text{ is a constant,} \quad 2 \leq R \leq 16 \quad \text{Eq. (7)}$$

If the condition in equation 7 is satisfied, Xdf may be used in generating the final output value Xout. Generally, no check is performed for vertical fitness, because the vertical fitness is automatically satisfied.

A function defined by equation 8 may be used to blend Xvf with Xco and generate the final output as follows:

$$Xout=Xco+\mu(Xvf-Xco) \quad \text{Eq. (8)}$$

The blending factor $\mu$ may be given by equation 9 as follows:

$$\begin{aligned}\mu &= 0, & \text{if } |xco - Xdf| < \tau \\ &= (|Xco - Xvf| - \tau)/OFFSET & \text{else if } |xco - Xvf| < \tau + OFFSET \\ &= 1 & \text{otherwise,}\end{aligned} \quad \text{Eq. (9)}$$

where $2 \leq OFFSET \leq 64$

The variable τ may be given by equations 10–12 as follows:

$$\tau 1 = (\max(|CUR(u-3,v)-CUR(u-1,v)|, |CUR(u-1,v) - CUR(u+1,v)|, |CUR(u+1,v)-CUR(u+3,v)|))/2 \quad \text{Eq. (10)}$$

$$\tau 2 = (\text{median}(|CUR(u-3,v)-CUR(u-1,v)|, |CUR(u-1,v) - CUR(u+1,v)|, |CUR(u+1,v)-CUR(u+3,v)|)*S)/4,$$
where $1 \leq S \leq 8$ \quad Eq. (11)

$$\tau = \min(\tau 1, \tau 2) \quad \text{Eq. (12)}$$

Figure 10:
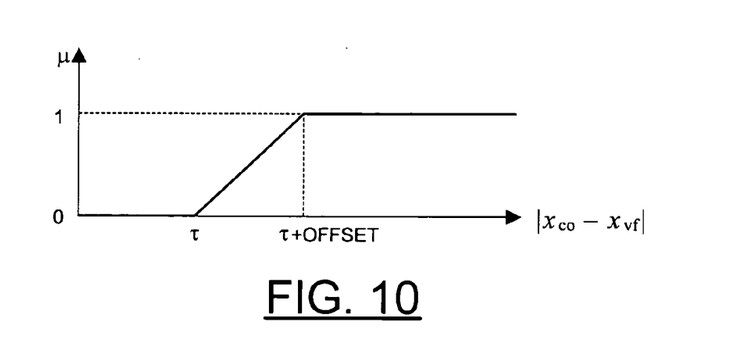
FIG. 10 is a diagram of a blending factor.

Referring to FIG. 10, a diagram of the blending factor μ as a function of the variables Xco and Xvf is shown. The variable τ1 used in the blending method may be similar to motion adaptive deinterlacing and motion compensated deinterlacing. The variable τ2 may be unique to the above blending. Use of the variable τ2 generally avoids artifacts in the vicinity of moving edges (not on the edges), which may be observed in experiments with a sage flag sequence and an F1 race car sequence. In such situations, if maximum is used, the variable τ1 may become quite large and thus the temporal filtering is generally used instead of the vertical filter. No new noticeable artifacts may be introduced by incorporating the variable τ2.

The deinterlacing method may use neighboring fields other than an immediately preceding opposite parity field. Any one of several fields or modified fields may be used to replace the previous field 102 without further changes. The modification may be performed by the MC/VT-filter circuit 134 and the result stored back into the memory circuit 122 or passed directly along to the deinterlacing circuit 132 (FIG. 4). Substituting for or modifying the previous field 102 may possibly improve a performance of the deinterlacing method and/or apparatus.

In one embodiment, a motion-compensated previous opposite-parity field (e.g., PREMC) may be used in place of the previous field 102. When implementing the motion-compensated previous opposite-parity field in the blending equation 8, the value Xco should be replaced by the value of the co-located sample in the motion-compensated previous opposite-parity field (e.g., PREMC(u,v)).

In another embodiment, the VT-filtered version of the previous opposite-parity field may be substituted for the previous field 102. Therefore, in the blending equation 8, the value Xco may be replaced by a value from equation 13 as follows:

$$Xco = Xvf + (-PRE(u-2,v)+2*PRE(u,v)-PRE(u+2,v))/8 \quad \text{Eq. (13)}$$

In still another embodiment, the VT-filtered version of the motion-compensated previous opposite-parity field may be substituted for the previous field 102. The value Xco used in the blending equation 8 may be replaced by a value from equation 14 as follows:

$$Xco = Xvf + (-PREMC(u-2,v)+2*PREMC(u,v) - PREMC(u+2,v))/8 \quad \text{Eq. (14)}$$

The present invention may provide a video format conversion method that is generally line-based. The deinterlacing generally uses two fields, a current field and a neighboring field combining temporal filtering, vertical spatial filtering, and spatial directional filtering pixel estimates through frame and/or pixel-level adaptive and/or non-adaptive switching and/or blending mechanisms. An additional (third) field may be included in the deinterlacing process. The additional field may be either a neighboring same parity or opposite parity field.

The previous (opposite parity) field may also be replaced with a motion compensated version of the previous field. The replacement may improve quality, especially for high-frequency textures that may be better estimated by motion estimation than by edge-based directional filtering. The motion compensated previous field generally increases complexity and resource use as the previous field is manipulated prior to deinterlacing. In a particular instance, an interpolated field may be constructed through motion compensated interpolation between a previous filed and a following (e.g., NEXT) opposite parity field such that the interpolated values may be an approximation of the opposite parity field content at the time instant of the current field. In another instance, the previous field and the following same parity field may also be used such that a high-frequency estimate at the subpel location of the opposite parity pixels of the current field may be approximated at the time instant of the current field.

The previous field may also be replaced with a VT-filtered version of the current field. The modified previous field may be modified to include low-pass vertically interpolated values from the current field plus a high-pass estimate from the previous field. The VT-filtered method generally reduces horizontal line-flickering artifacts for stationary regions of the video.

The previous field may be replaced with a VT-filtered and motion compensated version of the current field. The previous field may be modified to include low-pass vertically interpolated values from the current field plus a high-pass estimate from the motion compensated previous field.

A hybrid of motion adaptive deinterlacing with the vertical temporal filter may be implemented by removing the directional filtering. The hybrid implementation may provide very low complexity and easy implementation in silicon. The hybrid implementation may result in increased vertical detail in comparison to motion adaptive deinterlacing and greatly reduced artifacts in comparison to straight VT-filtering.

The directional edge estimator may be modified to use any one or more the following variations. A horizontal window of samples from a small integer number of horizontal lines (e.g., two or four lines) of the current field may be used for estimating the presence and direction of a high contrast edge. The samples used by the directional edge estimator may be stored at a reduced bit-depth to reduce arithmetic and storage criteria resulting in a more cost effective silicon implementation. The edge estimator may use a series of moving averages of directional pixel difference metrics. The moving averages may be a sum of absolute differences between adjacent samples along the specific angular direction of the edge. The deinterlacing may operate on luminance samples with chrominance being dealt with through existing methods to reduce complexity. The deinterlacing may also operate on complete pixels.

The best features of the present invention may be evident when implemented as a deinterlacing device that requires only a modest amount of silicon and consumes a minimal memory bandwidth during operation to transfer only two (or possibly three) fields, uses a small integer number of line buffers from each field and incorporates efficient and minimal arithmetic operations. The present invention generally gives improved quality over existing deinterlacing approaches, particularly a good trade-off between reducing flicker, reducing interlace artifacts, retaining high vertical frequencies, and rendering edges smoothly may be achieved.

Edges generally look better using the present invention than with plain motion adaptive or motion compensated deinterlacing. Non-edge regions may also look better than with purely edge-based interpolation or other purely spatial-based interpolation techniques. The combination of picture and pixel-level adaptive and/or non-adaptive switching and/or blending may effectively reduce blocking artifacts while permitting each internal sub-method to contribute best performance to improving quality in local regions.

The function performed by the flow diagram of FIG. 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAS, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for deinterlacing a picture, comprising the steps of:
   (A) calculating a plurality of differences among a plurality of current samples from a current field of said picture, said differences being calculated along a plurality of line segments at a plurality of angles proximate a particular position between two field lines from said current field;
   (B) generating a first sample at said particular position by vertical filtering said current field in response to said differences indicating that said particular position is a non-edge position in said picture; and
   (C) generating a second sample at said particular position by directional filtering said current field in response to said differences indicating that said particular position is an edge position in said picture.

2. The method according to claim 1, further comprising the step of:
   checking said second sample against a plurality of neighbor current samples from said current field proximate to said second sample.

3. The method according to claim 2, further comprising the step of:
   adding said second sample to said current field in response to said checking indicating that said second sample is similar to said neighbor current samples.

4. The method according to claim 2, wherein step (B) is performed in further response to said checking indicating that said second sample is dissimilar to said neighbor current samples.

5. The method according to claim 4, further comprising the step of:
   blending said first sample with a third sample from said particular position in a neighboring field of said picture.

6. The method according to claim 1, wherein said angles comprise a plurality of first angles between 0 and 90 degrees noninclusive and a plurality of second angles between said 90 degrees and 180 degrees noninclusive relative to a horizontal axis through said particular position.

7. The method according to claim 1, further comprising the step of:
   generating a plurality of pad samples beyond a boundary of said current field to supplement said current samples in generating said differences.

8. The method according to claim 1, further comprising the step of:
   adding a third sample from said particular position in a previous field of said picture to said current field in response a first determination to deinterlace only by temporal filtering.

9. The method according to claim 8, further comprising the step of:
   generating a fourth sample at said particular position in response to a second determination to deinterlace only by vertical filtering.

10. The method according to claim 9, further comprising the steps of:
    generating a plurality of pad samples beyond a boundary of said current field to supplement said current samples;
    checking said second sample against a plurality of neighbor current samples from said current field vertically adjacent to said second sample;
    adding said second sample to said current field in response to said checking indicating that said second sample is similar to said neighbor current samples;
    generating a fifth sample by blending said first sample with said third sample in response to said checking indicating that said second sample is dissimilar to said neighbor current samples; and
    adding said fifth sample to said current field.

11. A method for format conversion, comprising the steps of:
    (A) reading a first field and a second field from a memory;
    (B) generating a plurality of directional estimations based on said first field for a plurality of interpolated samples to be added into said first field to form a frame; and
    (C) generating said interpolated samples using (i) temporal filtering based on said first field and said second field, (ii) vertical spatial filtering based on said first field and (iii) spatial directional filtering based on said directional estimations and said first field.

12. The method according to claim 11, wherein step (C) comprises the sub-step of:
    generating said interpolated samples using at least one of (i) a weave, (ii) a bob and (iii) a blending of said temporal filtering and said spatial directional filtering.

13. The method according to claim 11, further comprising the step of:
    performing a horizontal stationary edge check based on a third field read from said memory.

14. The method according to claim 11, further comprising the step of:
    motion compensating said second field prior to generating said interpolated samples.

15. The method according to claim 11, further comprising the step of:
    vertical spatial filtering said second field prior to generating said interpolated samples.

16. The method according to claim 11, further comprising the steps of:
    vertical spatial filtering said second field; and motion compensating said second field prior to generating said interpolated samples.

17. The method according to claim 11, wherein generating said directional estimations uses at least one of (i) a horizontal window having no greater than four field lines of said first field to estimate a presence and a direction of a high contrast edge; (ii) a plurality of reduced samples from said second field each having a reduced bit-depth, (iii) a plurality of moving averages of directional sample difference metrics.

18. The method according to claim 11, wherein each of said first field and said second field comprise a plurality of luminance samples.

19. The method according to claim 11, further comprising the step of:
    performing a stationary pixel check based on a third field read from said memory.

20. An apparatus comprising:
    means for storing a first field and a second field;
    means for vertical spatial filtering said second field;
    means for generating a plurality of directional estimations based on said first field for a plurality of interpolated samples to be added into said first field to form a frame; and
    means for generating said interpolated samples using (i) temporal filtering based on said first field and said second field after said vertical spatial filtering and (ii) vertical spatial filtering based on said first field.

* * * * *